(12) United States Patent
Gin et al.

(10) Patent No.: US 12,462,266 B2
(45) Date of Patent: Nov. 4, 2025

(54) METHODS AND SYSTEMS FOR EVALUATING CONTENT

(71) Applicant: Datasine Limited, London (GB)

(72) Inventors: James Gin, London (GB); Chris Loy, London (GB); Igor Volzhanin, London (GB)

(73) Assignee: SHUTTERSTOCK.AI INTERNATIONAL LIMITED, London (GB)

( * ) Notice: Subject to any disclaimer, the term of this patent is extended or adjusted under 35 U.S.C. 154(b) by 317 days.

(21) Appl. No.: 17/555,100

(22) Filed: Dec. 17, 2021

(65) Prior Publication Data

US 2022/0198486 A1 Jun. 23, 2022

(30) Foreign Application Priority Data

Dec. 18, 2020 (GB) ..................................... 2020206

(51) Int. Cl.
*G06Q 30/0202* (2023.01)
*G06Q 30/0201* (2023.01)

(52) U.S. Cl.
CPC ..... *G06Q 30/0202* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 10,390,065 B2* | 8/2019 | Yu | .................... | H04N 21/44204 |
| 10,552,885 B2* | 2/2020 | Zuverink | ............ | G06F 3/04842 |
| 10,896,439 B1* | 1/2021 | Jogia | .................. | G06Q 30/0242 |
| 2009/0171749 A1* | 7/2009 | Laruelle | ............ | G06Q 30/0254 |
| | | | | 705/14.1 |
| 2016/0071162 A1* | 3/2016 | Ogawa | ................... | G06Q 50/01 |
| | | | | 705/14.66 |
| 2017/0061468 A1* | 3/2017 | You | ........................ | H04W 4/21 |
| 2019/0172089 A1* | 6/2019 | Tang | .................. | G06Q 30/0242 |

(Continued)

FOREIGN PATENT DOCUMENTS

| | | |
|---|---|---|
| GB | 2471432 A | 12/2010 |
| GB | 2522532 A | 7/2015 |

(Continued)

OTHER PUBLICATIONS

Roffo, Giorgio, "Ranking to Learn and Learning to Rank: On the Role of Ranking in Pattern Recognition Applications." Cornel Univ. Library, New York, Jun. 1, 2017, 245 pages.

(Continued)

*Primary Examiner* — Jamie H Austin
(74) *Attorney, Agent, or Firm* — McDermott Will & Schulte LLP

(57) ABSTRACT

Methods and systems of evaluating content using neural networks and models. Content to be evaluated is input into a system where it is processed using neural networks. A machine learning model then takes the processed content along with information regarding the context of the content and produces a prior score for each piece of content. The prior score is then used as an input to a Bayesian model, along with further information. The Bayesian model outputs predictions relating to the content, along with confidence levels associated with the predictions.

14 Claims, 9 Drawing Sheets

(56) References Cited

U.S. PATENT DOCUMENTS

| | | | | |
|---|---|---|---|---|
| 2020/0186645 A1* | 6/2020 | Gorny | ............... | H04M 3/5175 |
| 2020/0302333 A1* | 9/2020 | Yan | ..................... | G06N 5/048 |
| 2020/0349605 A1* | 11/2020 | Geyik | ............. | G06Q 30/0243 |
| 2021/0326718 A1* | 10/2021 | Olson | ................. | G06N 20/00 |
| 2022/0198486 A1* | 6/2022 | Gin | ..................... | G06N 3/006 |
| 2022/0384038 A1* | 12/2022 | Martin | ................ | G06F 16/35 |
| 2023/0334359 A1* | 10/2023 | Davin | ................... | G06N 7/01 |

FOREIGN PATENT DOCUMENTS

| | | | |
|---|---|---|---|
| GB | 2532538 A | 5/2016 | |
| GB | 2572362 A | 10/2019 | |

OTHER PUBLICATIONS

UK IP Office—Examination Opinion for corresponding GB Application No. 2020206.5, mailed May 27, 2021; 8 pgs.

\* cited by examiner

1

METHODS AND SYSTEMS FOR EVALUATING CONTENT

CROSS-REFERENCE TO RELATED APPLICATIONS

The present application claims priority under 35 U.S.C. §119 to UK Patent Application No. GB2020206.5 filed on Dec. 18, 2020. The above application is hereby expressly incorporated by reference, in its entirety, into the present application.

TECHNICAL FIELD

Embodiments of the present invention described herein relate to methods and systems for evaluating content.

BACKGROUND TO THE INVENTION

Companies are always attempting to boost customer engagement using marketing. Companies aim to raise consumer interaction rates with appealing content, often in the form of advertisements or 'ads'. Companies spend a fortune on marketing campaigns, without being able to accurately predict how potential or current customers will react to the campaign's content. Evaluating the likely success of future marketing campaigns before they launch is desirable to brands as this allows them to focus on marketing campaigns which are forecasted to perform the best. By predicting future marketing campaign performances before they are launched, brands can avoid wasting money on campaigns which are unlikely to perform well, and instead prioritise those which are deemed likely to succeed. Measures of success vary from company to company. For example, some companies may wish to define successful outcomes in terms of impressions, some in terms of clicks, and some in terms of conversion.

Optimising advertising content is primarily achieved through a process of testing and learning. The sophistication of these approaches ranges from manually recorded tests to large multivariate tests performed using third party platforms. Each of these methods rely on running live paid tests of the advertisements on a segment on the target audience, then choosing the winning variation to use for the full campaign. As a result, this is a costly methodology which also treats each experiment in an independent way, with learnings not carried forward or aggregated across experiments.

It is an object of the present invention to provide a system which uses machine learning and historical data to predict a consumer interaction rate associated with a piece of content.

SUMMARY OF THE INVENTION

Embodiments of the present invention address the above problem, by providing a computer implemented method for automatically analysing content using machine learning and Bayesian statistics to predict the consumer interaction rate of said content, based on historical consumer interaction rates of historical content.

In view of the above, from a first aspect, the present disclosure relates to a computer implemented method for automatically analysing content to predict the consumer interaction rate of said content, based on historical consumer interaction rates of historical content. The method comprises: (i) receiving content data, the content data relating to said content and comprising image data and/or text data, the content data having associated contextual metadata defining contextual attributes of said content; (ii) processing the image data and/or the text data to determine feature vectors of the image data and/or the text data; (iii) inputting the contextual metadata and the feature vectors of the image data and/or the text data into a machine learning model; (iv) predicting, using the machine learning model, where said content would be ranked within a plurality of historical content, the plurality of historical content being comprised of historical content having similar associated contextual metadata to the said content, wherein the plurality of historical content is ranked by historical consumer interaction rate; (v) outputting a prior probability from the machine learning model, the prior probability being based on said content's predicted rank; (vi) receiving additional metadata relating to the content to be analysed; and (vii) inputting the additional metadata and the prior probability into a Bayesian model to output a posterior probability with associated credible intervals; wherein the posterior probability represents the predicted consumer interaction rate of said content.

Several advantages are obtained from embodiments according to the above described aspect. For example, predicting the impact of content before it has been published allows a user of the present invention to optimise the content for the highest predicted consumer interaction rate. A user may use the above method to analyse multiple different content options in order to choose the best one. Without this method, the user would have to publish the content to gauge the consumer interaction rate. Publishing the content involves large costs and risks to the user's reputation. The method enables the user to easily predict how well a piece of content will perform, and by analysing a plurality of content options, tweak the content in order to optimise the consumer interaction rate. Using a model based approach also means that every historical test and advertising campaign's value is utilised going forward, each contributing to the knowledge of the system. This replaces a manual and often very informal learning approach which can lead to experiments being repeated unnecessarily. As an example, a user of the present invention may be a company deciding which advertising campaign is likely to be the most successful.

Contextual metadata may comprise information regarding one or more of the following: the type of content (e.g. single image, carousel, dynamic), the placement of the content (e.g. social media feeds, messages), and/or the audience of the content (e.g. named specific audiences, the interests of the audience, audience demographic). "Similar" contextual metadata means that the historical content and the content to be analysed will both have at least one category of contextual metadata in common, and preferably more than one category of contextual metadata in common. For example, the historical content and the content to be analysed may all be the same type of content (e.g., single image, carousel, dynamic), and/or may all have the same placement of the content (e.g. social media feeds, messages), and/or may all have the same audience of the content (e.g. named specific audiences, the interests of the audience, audience demographic).

In some embodiments, one or more pieces of content may be analysed such that each piece of content has an associated predicted consumer interaction rate, and the method may further comprise selecting a first piece of content from the one or more pieces of content, the first piece of content having a highest predicted consumer interaction rate. In other words, one or more pieces of content may be analysed to produce one or more predicted consumer interaction rates, each piece of content having an associated predicted consumer interaction rate. The piece of content ('a first piece of content') with the highest predicted consumer interaction rate out of the one or more predicted consumer interaction rates may be selected. A first communication comprising the first piece of content for distribution to one or more consumers may then be produced.

In some embodiments, wherein the first communication has been distributed to one or more consumers such that the first communication comprises a live ad, the method may further comprise: (i) receiving new impression data relating to performance of the live ad; and (ii) inputting the new impression data into the Bayesian model to output an updated posterior probability with associated credible intervals, wherein the updated posterior probability represents the predicted consumer interaction rate of the first piece of content, taking into account the new impression data. In some embodiments, the computer implemented method may also comprise determining whether the updated posterior probability is below a threshold value. In some embodiments, the method may further comprise communicating an alert to a user if the updated posterior probability is found to be below the threshold value. In some embodiments, wherein if the updated posterior probability is found to be below the threshold value and two or more pieces of content were analysed, the method further comprises: (i) selecting a second piece of content from a remaining one or more pieces of content, the second piece of content having a highest predicted consumer interaction rate based on the updated posterior probability associated with the first piece of content and associated predicted consumer interaction rates of the remaining one or more pieces of content; and (ii) producing a second communication comprising the second piece of content for distribution to one or more consumers. An updated posterior probability may be produced either: (a) every time new impression data is received; (b) every Xth time new impression data is received, wherein X is an integer; (c) once per predetermined time interval; (d) when an instruction is received from a user; or (e) when a webpage displaying the live ad is accessed.

The above embodiments are advantageous as they enable rescoring of a live ad in real time according to the advertising performance of the live ad. The model may continually adjust the real time predictions of the ad's performance depending on new impression data. The receiving of new impression information triggers the Online Bayesian model to re-run and update its predictions and confidence outputs. The receiving of new impression information may be triggered periodically and/or triggered by a user request, for example, a user may trigger the receipt of new impression information when they access a page displaying the live ad. The frequency of the production of an updated posterior probability may be varied based on the frequency of consumer interaction with the live content. In other words, the latest impression data relating to the ad is used to update the model's predictions, and if the update to the prediction means that the prediction is below a predetermined threshold value, an alert may be communicated to the user. Additionally or alternatively, in situations where two or more pieces of content were initially analysed to select the best performing piece of content in the same way as described above, i.e. there is a choice of content, the method may further comprise choosing a second piece of content which now has a higher predicted consumer rate than the first (initially selected) piece of content, due to the updated prediction. A second communication comprising the second piece of content may then be produced for distribution to one or more consumers.

In some embodiments, the processing of the image data and/or the text data to determine feature vectors of the image data and/or the text data may comprise using an artificial intelligence program. In some embodiments, the artificial intelligence program may comprise a computer vision module and/or a natural language processing module. This processing is advantageous as it allows the content to be converted into a data format (i.e. feature vectors) which can be easily understood by the feature prior and/or Bayesian models.

In some embodiments, the content may be an entire advertisement, e.g. may include text, images and background. In other embodiments, the content may be a component of an advertisement, e.g. may be a piece of text or an image.

In some embodiments, consumer interaction rate may refer to an action per impression rate.

In a second aspect of the invention, there is a computer system for automatically analysing content to predict the consumer interaction rate of said content, based on historical consumer interaction rates of historical content. The system comprises a processor and a memory including computer program code. The memory and the computer program code are configured to, with the processor, cause the apparatus to perform the method of automatically analysing content to predict the consumer interaction rate of said content, based on historical consumer interaction rates of historical content, as described above.

In a third aspect of the invention, there is a computer implemented method for training a system to automatically analyse content to predict consumer interaction rate of said content, based on historical consumer interaction rates of historical content. The method comprises: receiving a plurality of historical content data, the historical content data relating to said historical content and comprising image data and/or text data, the historical content data having associated contextual metadata defining contextual attributes of said historical content, each of the plurality of historical content data having similar associated contextual metadata to each other; processing the image data and/or the text data to determine feature vectors of the image data and/or the text data such that each of the plurality of historical content data has associated feature vectors; inputting the contextual metadata and the feature vectors of the image data and/or the text data into a machine learning model; ranking the plurality of historical content data based on one or more performance indicators such that each of the plurality of historical content data has an associated ranking; and training a machine learning model using the associated feature vectors and associated rankings of each of the plurality of historical content data such that the trained machine leaning model can predict future rankings of content data.

BRIEF DESCRIPTION OF THE DRAWINGS

Embodiments of the invention will now be further described by way of example only and with reference to the accompanying drawings, wherein.

DESCRIPTION OF THE EMBODIMENTS

Overview

Figure 1:
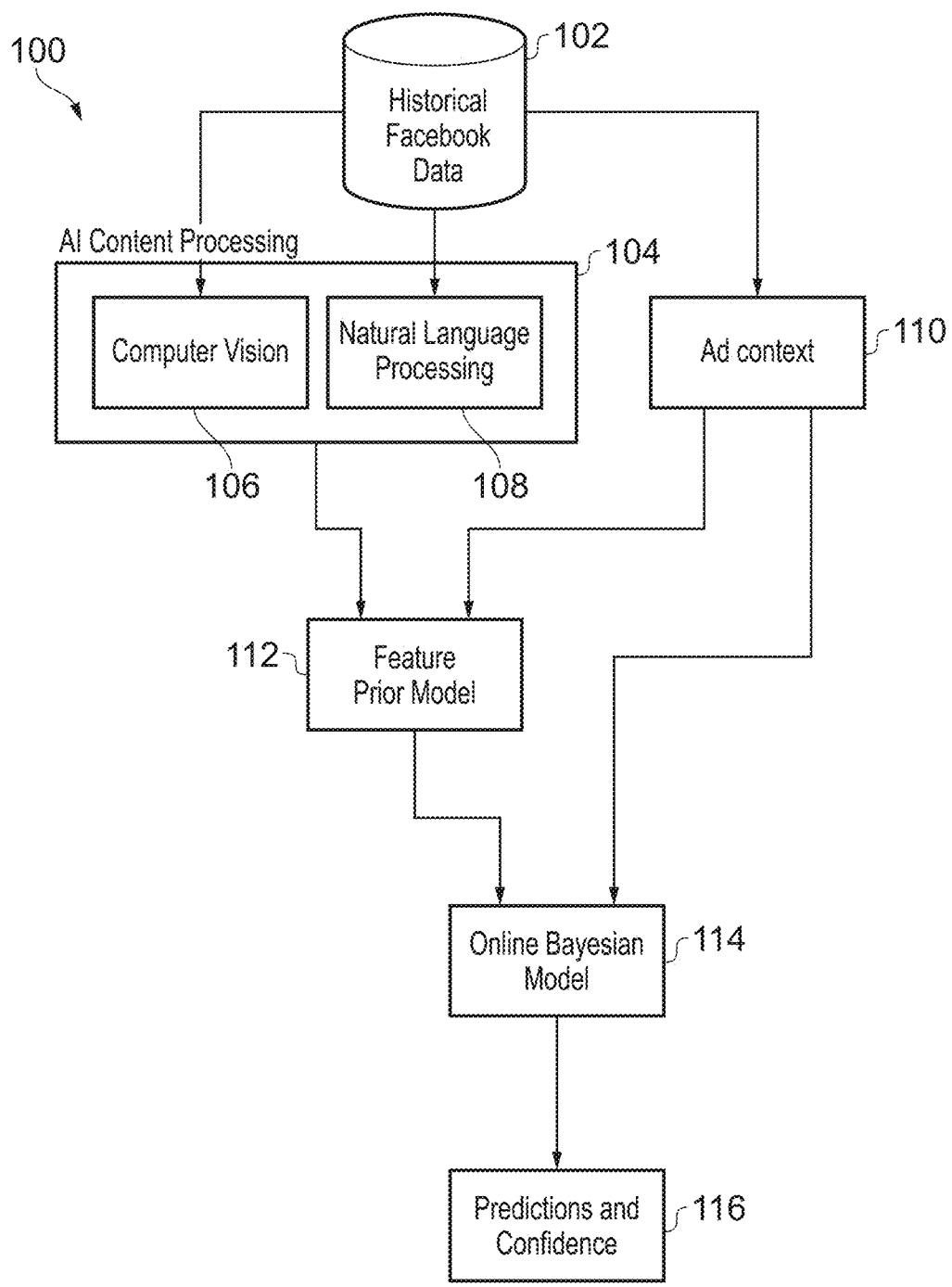
FIG. 1 is a high level diagram illustrating the components of embodiments of the present invention.

Embodiments of the present invention use historical data of performances of a user's previous ('historical') content (the content may be advertising content or 'ads') to predict the performance of the user's future content. Neural networks are able to recognise features in the content. Features of the content, along with information about the context of the content, are input into a machine learning model which is trained to predict the ranking of the content within the historical content based on consumer interaction rate. The machine learning model outputs a prior score based on the ranking. A Bayesian model then takes the prior score and some additional data relating to the content to produce a prediction score. The prediction score represents how well the content is predicted to perform, performance being measured by consumer interaction rate. For example, in the case of advertising, a consumer interaction rate may be how many impressions result in a purchase or an enquiry.

In more detail, neural networks are used to process the images and text of content to recognise features of the content (for example, features may include special offer stickers, various animals, colours etc.), allowing complex analysis of the ads using feature vectors. The use of neural networks in this way is referred to herein as 'AI content processing'.

Context information, which may be associated with each piece of content, can take into account who the content was shown to (e.g. TV customers or social media consumers). This is important for adjusting for inherently different performance characteristics of different placements and audiences and prevents the system from falsely attributing performance to content that is actually more explainable by context. Context information can be input into the system in the form of contextual metadata associated with the content to be analysed. A 'feature prior' model is used to predict the rank of the content to be analysed within content of a similar context. A feature prior model may use context information and identified features of the content in their feature vector form from the AI content processing module. Context information may be used in the feature prior model to exploit non-linearities, i.e. different scores for the same content in different contexts. The output of the feature prior model is a predictive 'prior' score for that piece of content, the score being relative to historical content of a similar context. This predictive prior score represents a prior probability, a well-known probability from Bayesian statistics.

A Bayesian model is used to predict values of new impressions using additional information, which may comprise additional context information, and the prior score. An impression occurs when a network displays a piece of content to a viewer. For an impression, whether or not the content is interacted with is not taken into account. The output of the Bayesian model is a score representing a posterior probability, which is also a well-known probability from Bayesian statistics. The posterior probability has associated inherent uncertainties, known as credible intervals in Bayesian statistics. This allows the system to tell a user how confident in its predictions it is. The Bayesian model may be trained online. Online training enables the model to process new data in real time, allowing the system to be used for monitoring the ongoing performance of a live piece of content. This capability is referred to herein as 'dynamic rescoring'.

In some embodiments, the online aspect of the Bayesian model allows dynamic rescoring in real time according to the live performance of the content. The model continuously adjusts its performance prediction in accordance with the latest information. In some embodiments, if the predicted performance falls below a threshold value, an alert is sent to the user.

In some embodiments, the Bayesian model can be used to track the inferred performance of content over time. This allows the user to see when the impact of the content is predicted to change. The inferred performance may be visualised on a plot. The future trends of the content's performance may be forecasted using the plotted data.

Various aspects and details of these principal components will be described below with reference to both FIGS. 1 and 2. FIG. 1 is a higher level illustration, and FIG. 2 is a lower level illustration of the core system 100, 200.

Figure 2:
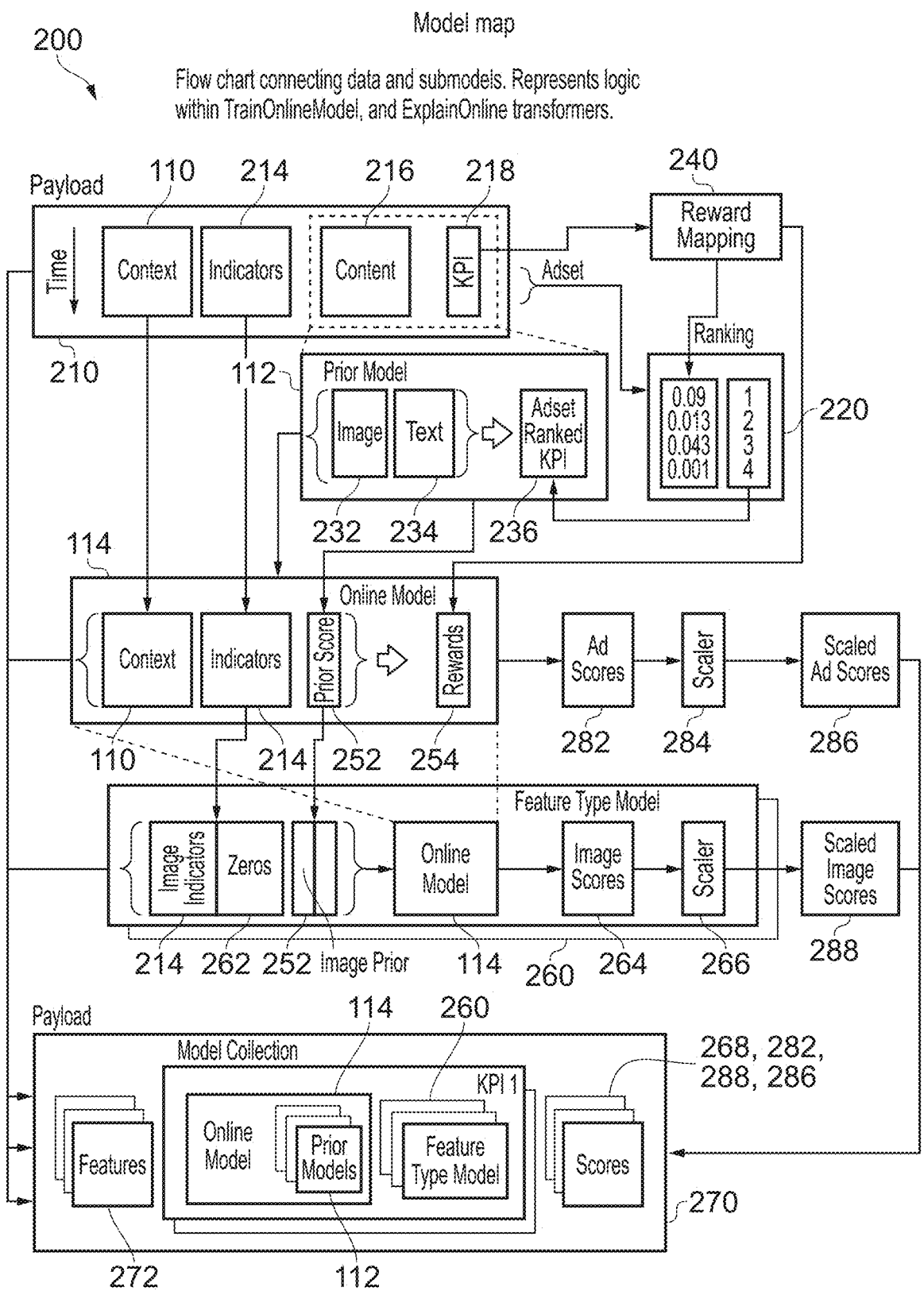
FIG. 2 is a lower level diagram illustrating the relationships between components of embodiments of the present invention.

FIGS. 1 and 2 are flow diagrams illustrating embodiments of the present invention comprising a core system 100, 200.

FIG. 1 illustrates how the core system 100, 200 may be trained in some embodiments of the present invention. The system 100 may be comprised of the following principal components: an AI content processing module 104, a feature prior model 112, and a Bayesian model 114. For the training process, the system 100 takes historical content data 102 (in the example of FIG. 1, historical Facebook data) and inputs the historical data 102 into an AI content processing module 104. The historical data 102 comprises information relating to historical content (image data and text data, the image data may comprise video data and/or still image data), and may also comprise metadata associated with each piece of historical content. The AI content processing module 104 processes the historical data 102 to determine feature vectors of the image data and/or text data, using a computer vision module 106 for image data and a natural language processing module 108 for text data. Each piece of content may have its own context information 110 associated with it, the context information 110 may comprise historical consumer interaction rates. The feature vectors and the context information 110 are fed into a feature prior model 112 which outputs prior scores. The training of the feature prior model 112 is described in more detail below. Each piece of content may have its own prior score associated with it. The prior scores and context information 110 are input into a Bayesian model 114 which outputs predictions and confidence values 116. Each piece of content may have its own predictions and confidence levels associated with it.

Although FIG. 1 illustrates the training of the system 100, 200 on historical data 102, the operation of the system on new content data follows the same steps, with the difference that the input is new content rather than historical content 102. Once the system 100, 200 is trained on historical data 102, the system 100, 200 can take the same approach on new content data to give predictions 116 based on the historical data 102 it was trained on.

FIG. 2 illustrates in more detail, the relationships between data and sub-models of the core system 100, 200 in some embodiments of the present invention. The system 200 takes in inputs 210 comprising context information 110, indicators 214, content 216 and key performance indicators (KPI) 218. Each piece of content 216 has associated metadata comprising context 110, indicators 214 and KPIs 218.

A reward mapping module 240 takes the KPIs 218 and allows different levels of 'reward' to be ascribed to different interactions, described in more detail below. The reward mapping module 240 outputs rewards 254.

A ranking module 220 takes a set of historical content (referred to in FIG. 2 as an 'adset'), along with reward information from the reward mapping module 240 and produces a ranked adset. The ranked adset comprises adset ranked KPIs 236. The ranked adset is used by the feature prior model 112.

The AI content processing module 104 (not shown in FIG. 2) takes each piece of content 216 and extracts feature vectors 232, 234 from the images and text used to form the content 216. Images may be understood to refer to still image content and/or video content.

The feature prior model 112 takes the feature vectors 232, 234 and the adset ranked KPIs 236 and produces a prior score 252. The training of the feature prior model is described separately below.

The Bayesian model 114 takes inputs of the context 110, indicators 214, prior score 252 and rewards 254. The Bayesian model 114 outputs predictions ('scores') 264, 282. These scores 264, 282 may have associated confidence levels. These scores 264, 282 may be scaled by a scaler 266, 284 to produce scaled scores 286, 288.

The two different branches of FIG. 2 resulting in ad scores and image scores relates to two potential uses of the system 100, 200. The system 100, 200 may be used to provide scores relating to entire ads "ad scores" 282. Alternatively or additionally, the system 100, 200 may be used to provide scores relating to individual features ('components') of ads, "image scores" 264. This second use is shown in the feature type model 260. The feature type model 260 takes indicators relating to the individual features, "image indicators" 214, with zeros 262 and also takes prior scores relating to the individual features "image prior" 252. These are input into the Bayesian model 114, which outputs predictions relating to the individual features, "image scores" 264, which may be accompanied by confidence levels. The image scores 264 may be scaled by a scaler 266 to produce scaled image scores 288. It is noted that although FIG. 2 describes the individual features of the ads to be images (i.e. image indicators, image prior, image scores), the individual features of the ads may be text-based.

The output 270 of the system 100, 200 may comprise any of the following: content features 272, scores 268, 282, 288, 286, the model collection comprising the Bayesian model 114, the feature prior models 112, and/or the feature type models 260.

Components of the core system 100, 200 will now be described in greater detail.

AI Content Processing Module

The AI content processing module 104 extracts informative feature vectors 232, 234 from the images and text used to form content 216. In the case of advertising creative, images (which may include video imagery) and text which visually make up an ad are often not seen as data. Neural networks are used for computer vision 106 and natural language 108 tasks to pre-process images and text into 232, 234 for downstream processing. For example, for the image processing 106, ImageNet trained Resenet features may be used, and for the text processing 108, the multilingual BERT language model may be used. BERT has the ability to handle data from multiple languages within the same model, allowing the transfer of proprietary models trained on one language across users' accounts based in different languages. BERT also allows the merging of accounts from multilingual users/brands into a single unified text model. The AI content processing module 104 may be used for historical data 102, and/or the content to be analysed 302 (i.e. the future ad or the live ad). In summary, the AI content processing module 104 recognises features 232, 234 of content 216, and may output these features in the form of feature vectors.

Context Information

The context information 110 enables adjustment for inherently different performance characteristics of different placements and audiences, and prevents falsely attributing performance to content that is actually more explainable by context. As an example, if an advertisement included a dog, but also included a 20% discount offer, it is likely that the positive performance of the advertisement was due to the discount offer, not the dog. Information relating to context 110 may be used as an input to both the feature prior model 112 and the Bayesian model 114. In some embodiments, the context information 110 input into the feature prior model 112 differs to the context information 110 input into the Bayesian model 114. In the feature prior model 112, the context information 110 is used to exploit non-linearities, i.e. different scores for the same content in different contexts.

Reward Ranking

The ranking module 220 orders a plurality of historical content (referred to in the Figures as an adset) for use in the feature prior model 112. In the case of advertising, historical ad metrics are inherently noisy for two reasons. Firstly, if the same ad is shown to the same person multiple times, they may click in one instance but not in others. This is known as randomness. Secondly, the aggregated statistics contain ads with varying numbers of impressions. The data space is also structured, with many accounts catering for multiple types of products, messaging, offers and audiences. In order to avoid issues like Simpson's Paradox (a phenomenon in probability and statistics, in which a trend appears in several different groups of data but disappears or reverses when these groups are combined), and also to reduce the effect of noise, the feature prior model 112 task is trained on the percentage rank within each adset of the observed reward rate (reward per impression). Practically, this means that within the plurality of historical content, the historical content is ordered by observed historical consumer interaction rate or a 'reward' rate. Consumer interaction rate or reward rate can be measured as the amount of reward per impression. Reward is a customisable value attributed to one or more actions taken by a consumer in response to the content, for example, commenting on the content, liking the content, purchasing a product, enquiring about a product, clicking on the content, etc. The content with the lowest consumer interaction rate is assigned the rank 0, the content with the highest consumer interaction rate is assigned the rank 1, and intermediate ranks are linearly interpolated. What is considered a 'reward' may vary between users of the present invention. The system may take an input of what a user counts as a reward, explained below. The system may take an input which causes the system to output scores tailored to a particular context. This input may be a user input. The ranking module 220 may use non-linear models which are conditional on the context information 110. The training of the feature prior model 112 is explained in more detail below.

Reward Mapping

A digital ad is normally linked to real-world actions taken by a digital consumer upon observing the ad. Social media can track ongoing interactions that the consumer takes after viewing, such as commenting, liking, clicking, all the way down to adding to basket and purchasing. Different users and/or brands value different actions in different ways, for example a retailer may optimise for purchases, whereas a service provider may optimise for leads to be followed up by a sales team. The reward mapping process 240 allows different values to be ascribed to each action based on the user's preferences, i.e. a click may be equal to 1 point of reward, whereas a lead may be equivalent to 10 points of reward and so on. A user's account may have multiple reward functions to provide them with models catering for different types of content objective. The rewards output 254 of the reward mapping process may be used within the Bayesian model 114 to account for individual preferences of a user of the present invention.

Feature Prior Model

The feature prior model 112 is a machine learning model which predicts the rank of a piece of content (e.g. an ad) within content of a similar context (which may be historical content), using the features of the content 216. The reason that it is called the "prior" model is that it represents, in a Bayesian sense, the "prior" estimate of the strength (with regards to consumer interaction rate) of a piece of content (e.g. an ad), and the Bayesian model 114 infers the "posterior" estimate. The prior estimate represents the prior probability distribution, a well-known probability distribution in Bayesian statistics. The prior probability of a random event is the unconditional probability assigned before relevant evidence is taken into account. Prior probabilities may be determined from historical information (in this case, the historical content data). Similarly, the posterior estimate represents the posterior probability distribution, another well-known probability distribution in Bayesian statistics. The posterior probability of a random event is the conditional probability assigned after relevant evidence is taken into account.

Posterior probability may be expressed as:

Posterior probability ∝ Likelihood × Prior probability

The prior probability is determined by the feature prior model 112. The posterior probability is determined by the Bayesian model 114. A likelihood function measures the goodness of fit of a statistical model to data. The standard likelihood function, as used in the Bayesian model 114, for Bayesian linear regression is as follows:

$$\rho(X, \beta, \sigma^2) \propto (\sigma^2)^{-n/2} \exp\exp\left(-\frac{1}{2\sigma^2}(y - X\beta)^T(y - X\beta)\right)$$

Where y is the regressand, X the regressors, β the vector of linear coefficients, σ the standard deviation of the distribution, and n is the number of data points.

The inputs to the feature prior model 112 may comprise the neural network feature vectors 232, 234 from the feature generating networks for text and image, i.e. the AI content processing module 104, and the calculated reward ranks 236, which are calculated by the ranking module 220, as described above.

This allows the system to give a user a good "prior" understanding of a feature's performance (where the feature may comprise image and/or text) with regards to consumer interaction rate, before it has actually been tried in the market. The resulting predicted score 252 (representing the prior probability distribution) from the feature prior model 112 is fed into downstream models (e.g. the Bayesian model 114). It is therefore important that the feature prior model 112 is of high quality, as the quality of the feature prior model 112 is directly responsible for the quality of the pre-testing performance of the entire system 100, 200. The training of the feature prior model 112 is described in more detail below.

Bayesian Model

The Bayesian model 114 predicts the value of every new impression by outputting a posterior probability prediction score 116, using additional metadata and prior scores 252 from the feature prior model 112. The Bayesian model 114 is responsible for supplying two important properties to the system, the ability to be trained "online", i.e. to process data (e.g. new impression information) in an incremental fashion, and the ability to model the inherent uncertainty associated with its predictions 116. The Bayesian model 114 uses the prediction score output 252 (the prior probability) of the feature prior model 112, and additional metadata as inputs.

The additional metadata may comprise context information, which may differ from the context information input into the feature prior model. This "additional" context information, or other additional data, may comprise indicator variables 214.

In some embodiments, if the content to be analysed is not live yet, additional information input into the Bayesian model 114 may be solely comprised of indicator variables 214 associated with each piece of content. Indicators 214 are described in more detail below.

In some embodiments, if the content is live, additional information input into the Bayesian model 114 may comprise contextual information about the live content, e.g. the live content's placement, audience, consumer interaction rate etc.

Indicators 214 of every piece of content and/or individual image and unique text block are added as features to the system, these indicators 214 may be one-hot indicators. This allows the score 282, 264 that the model 114 gives a piece of content or an individual image to vary slightly from the prior score 252 (which is determined by the neural network features 232, 234). This is because it is acknowledged that the system's features will never capture everything there is to measure about a piece of content 216. This also enables the alert functionality of the monitoring workflow, described below, because the presence of the indicators 214 would allow an image or piece of content which is initially thought to be good to then register as an alert if the ad underperforms. If the ad underperforms the indicator variable 214 gains a negative coefficient in a way that respects the underlying data, number of impressions etc.

The output 252 of the feature prior model 112 accounts for the content itself. The context information 110 associated with each ad may be provided by the platform on which the ad is shown (e.g. social media or a TV channel operator), and the context information 110 may include information such as the ad's audience and/or the ad's format.

The Bayesian model 114 is trained on the inferred reward value 254 of each impression. As some ad platforms (e.g. social media platforms) do not return individual impressions, but aggregations of impressions and actions, these aggregations may be transformed in a way that allows us to estimate the impact of each individual impression.

| Events | Impressions | Rate |
|--------|-------------|------|
| 100    | 100000      | 0.1% |
| 0      | 1000        | 0.0% |
| 10     | 100         | 1%   |
| 1      | 5           | 20%  | i.e. 100 points with the outcome "event" and 99900 points with the outcome "no event"

i.e. 1 point with outcome "event" and 4 points with outcome "no event".

This helps deal with data noise by naturally upweighting ads with more impressions and downweighting those with fewer. Ads can have impressions in the millions, so in order to process this without naively duplicating a dataset many thousands of times (which would scale very badly), an update to the closed-form mini-batch Bayesian regression posterior update equation was derived. This allows the Bayesian model 114 to be trained in a reasonable time.

Given that X is a matrix of regressors, and y a vector of regressands, let r be a vector of the number of repeats that the datapoint should be repeated by. The updated posterior estimate for the covariance matrix ($\Sigma$) and mean vector are as follows ($\mu$), with beta ($\beta$) as a hyperparameter:

$$\sum_{t+1}^{-1} = \sum_{t}^{-1} + \beta + \sum_{i} r_i x_i^T x_i$$

$$\underline{\mu}_{t+1} = \sum_{t+1} \left( \sum_{t+1}^{-1} \underline{\mu}_t + \beta(\underline{y} \odot \underline{r}) \right)$$

The monitoring use-case necessitates that the model 114 be trainable online. To do this, as stated in the paragraph above, the prediction problem is refactored, typically at the ad level (n=number of ads), to the impression level, and extend the classic Bayesian regression model to work on batches with highly repetitive values, as impressions can be in the millions. This allows the incremental processing of each new impression for a live ad (illustrated in FIG. 5 and explained in more detail below), and triggers alerts when a particular ad is performing significantly worse (with respect to the posterior predictive distribution) than expected (illustrated in FIG. 6 and explained in more detail below). Indicator variables 214 for each unique content function as slack variables which learn deviation from the prior prediction 252 and the observed performance, facilitating content specific learning across multiple live ads containing the same piece of content, including within the training set.

The use of a Bayesian model rather than some form of quantile regression enables the use of coefficient distributions to indicate the strength of interactions between performance and contexts, as well as the confidence of the model for those interactions.

The Feature Type Model

As described above in relation to FIG. 2, the feature type model 260 illustrates how the system 100, 200 can be used to produce scores ("image scores") 264 which relate to individual features of content, e.g. specific images or text. This use is shown in the branch of FIG. 2 with the Feature Type model 260. The system works in the same way as described above in relation to whole pieces of content 216, but with individual features/components of an ad, for example.

Scaled Scores

The image scores 264 and/or the ad scores 282 may be scaled using scalers 266, 284 to produce scaled image scores 288 and scaled ad scores 286, respectively. The scores are scaled by standardising them to a unit normal distribution by subtracting the mean and dividing by the standard deviation, then transforming them into a range between zero and one by using the cumulative density function of the normal distribution.

Summary Flow Chart

Figure 3:
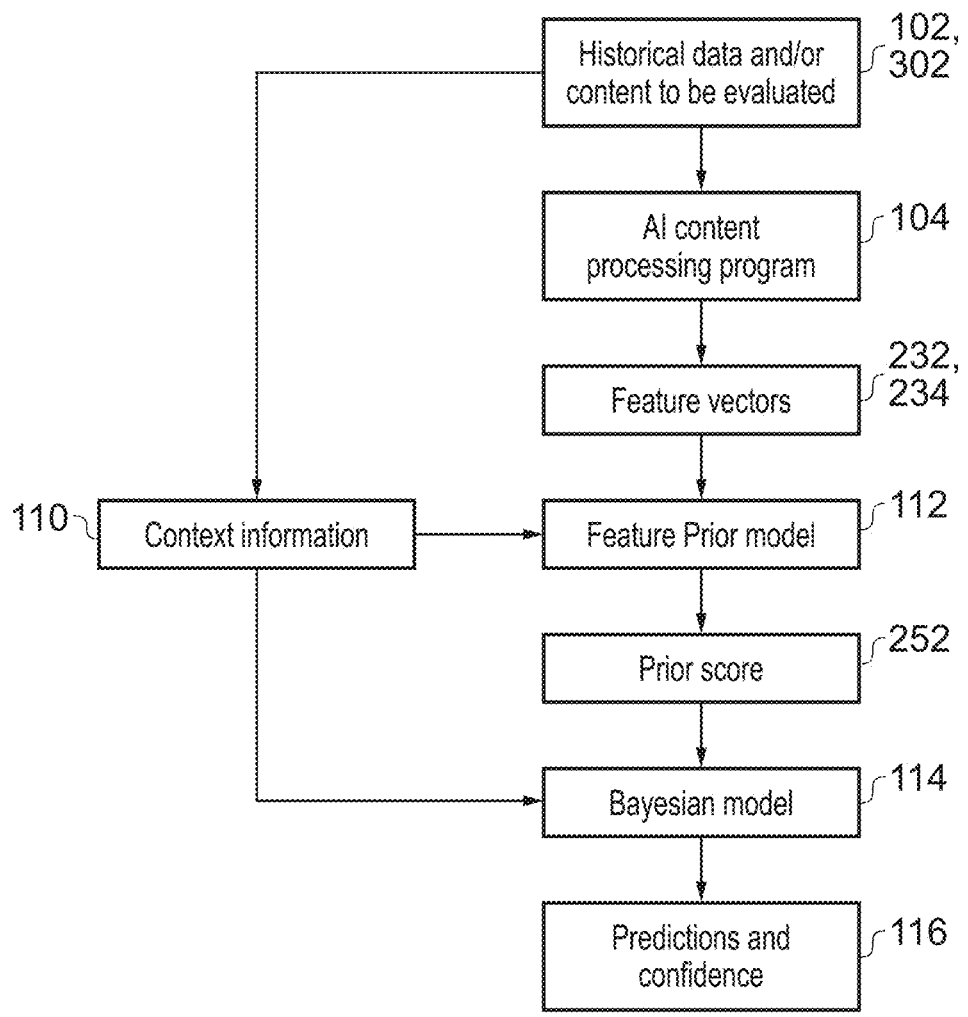
FIG. 3 is a flow chart illustrating embodiments of the present invention.

FIG. 3 is a flow chart summarising embodiments of the present invention. Historical data 102 and/or content to be evaluated 302 (depending on whether the system is in training mode or not—historical data is used in training mode) is input into an AI content processing program 104, as described above. The AI content processing program 104 outputs feature vectors 232, 234. Context information 110 and the feature vectors 232, 234 are used as inputs into the feature prior model 112. The feature prior model 112 then outputs a prior score 252. Additional information, which is context information 110 in the example illustrated by FIG. 3, and the prior score 252 are used as inputs into a Bayesian model 114, which outputs predictions with confidence levels 116. The predictions 116 may comprise image scores 264, ad scores 282, scaled image scores 288 and/or scaled ad scores 286.

Training of the Feature Prior Model

Figure 4:
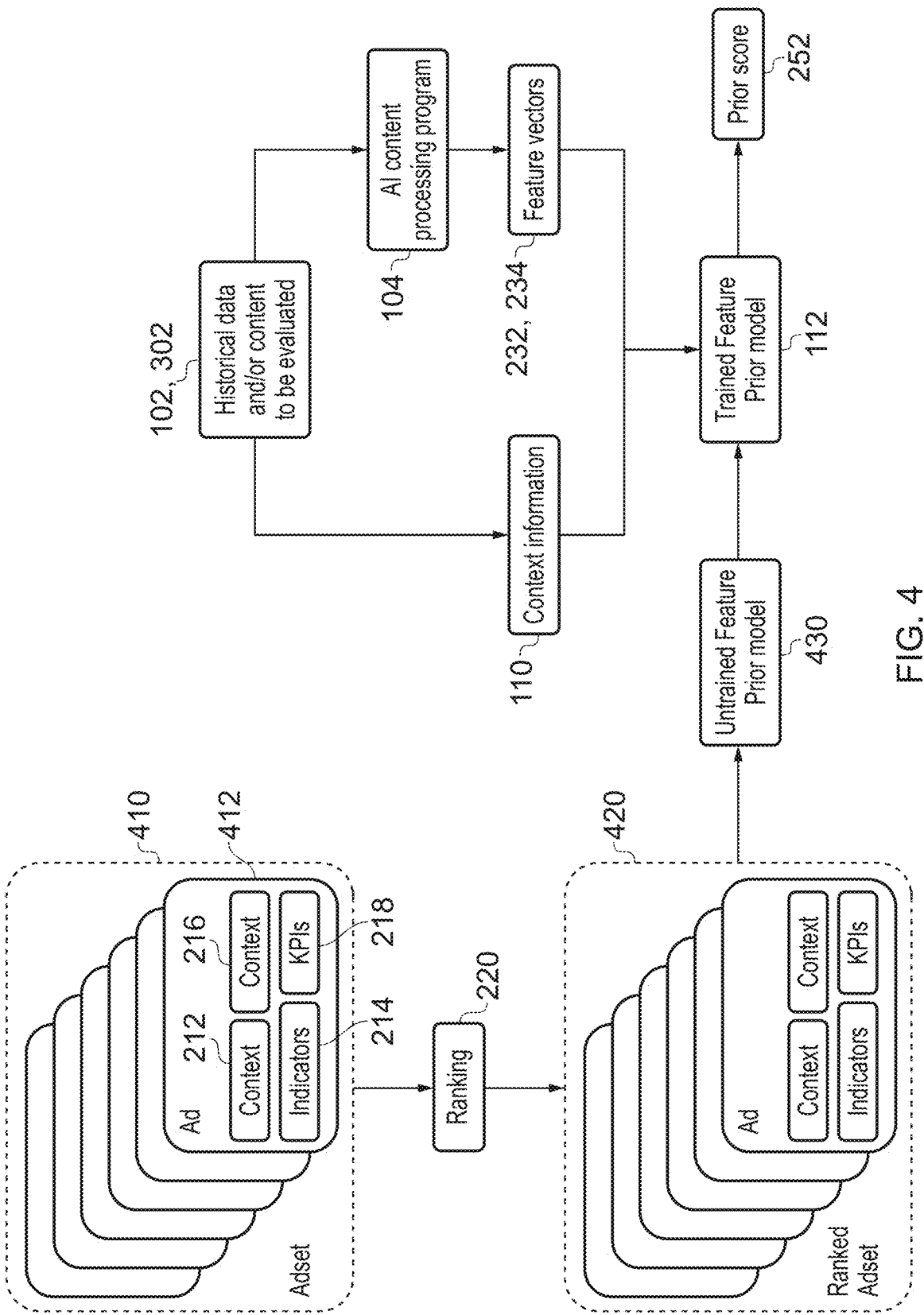
FIG. 4 is a flow chart illustrating how the feature prior model may be trained in accordance with embodiments of the present invention.

FIG. 4 is a flow chart summarising the training of the feature prior model 112 using the ranking module 220. The untrained feature prior model 430 is trained on a reward ranking task 220. Sets of content, which may be historical content, (e.g. ads), or "adsets" 410 are used to symbolise groups of content relating to the same underlying concept, i.e. content with similar context information 110. Without constructing this concept-agnostic dataset, concept would be conflated with style. Although context does not vary between content within an adset, context information 110 may be used to allow the feature prior model 112 to exploit any non-linear relationships resulting from the combinations of context and content features. An adset 410 is comprised of a plurality of ads 412. Each ad 412 comprises ad content 216 and has metadata comprising key performance indicators (KPI) 218 associated with it. The ranking module 220 ranks the ads 412 within the adset 410 based on the reward mapping output to produce a ranked adset 420. This ranked adset 420 is used to train an untrained feature prior model 430 to produce a trained feature prior model 112 by using an arbitrary machine learning model. The learning model is trained on historical pairs of feature vectors and adset ranks to predict future rankings based on new feature vectors. This training setup allows the use of estimators of arbitrary complexity, from regularised linear models to tree-based gradient boosting models which account for greater non-linearity. For example, for large user accounts with large amounts of historical content data, more complex estimators (e.g. the tree-based gradient boosting models) can be used. For smaller accounts with less historical content data, less complex estimators (e.g. regularised linear models) can be used. The feature prior model 112 can then produce prior scores 252 in relation to the content to be analysed, as previously described.

Applications

Pre-Campaign Optimisation

The system can predict the likely performance of ads before they are live. The content of each ad is encoded, i.e. AI content processing program 104, (the images may be encoded via convolutional neural networks, and the text may be encoded via transformers).

Metadata associated with each ad may also be encoded using neural networks. This metadata may comprise information regarding one or more of the following: the type of content (e.g. single image, carousel, dynamic), the placement of the content (e.g. social media feeds, messages), and/or the audience of the content (e.g. named specific audiences, the interests of the audience, audience demographic). This encoded representation is fed into a pre-trained machine learning model (i.e. the feature prior model 112), which may be custom built for each user and may be hosted on the cloud. Predicted scores 116 are returned to the user, so they can make informed decisions regarding the content of their ads, before they are live.

Figure 7:
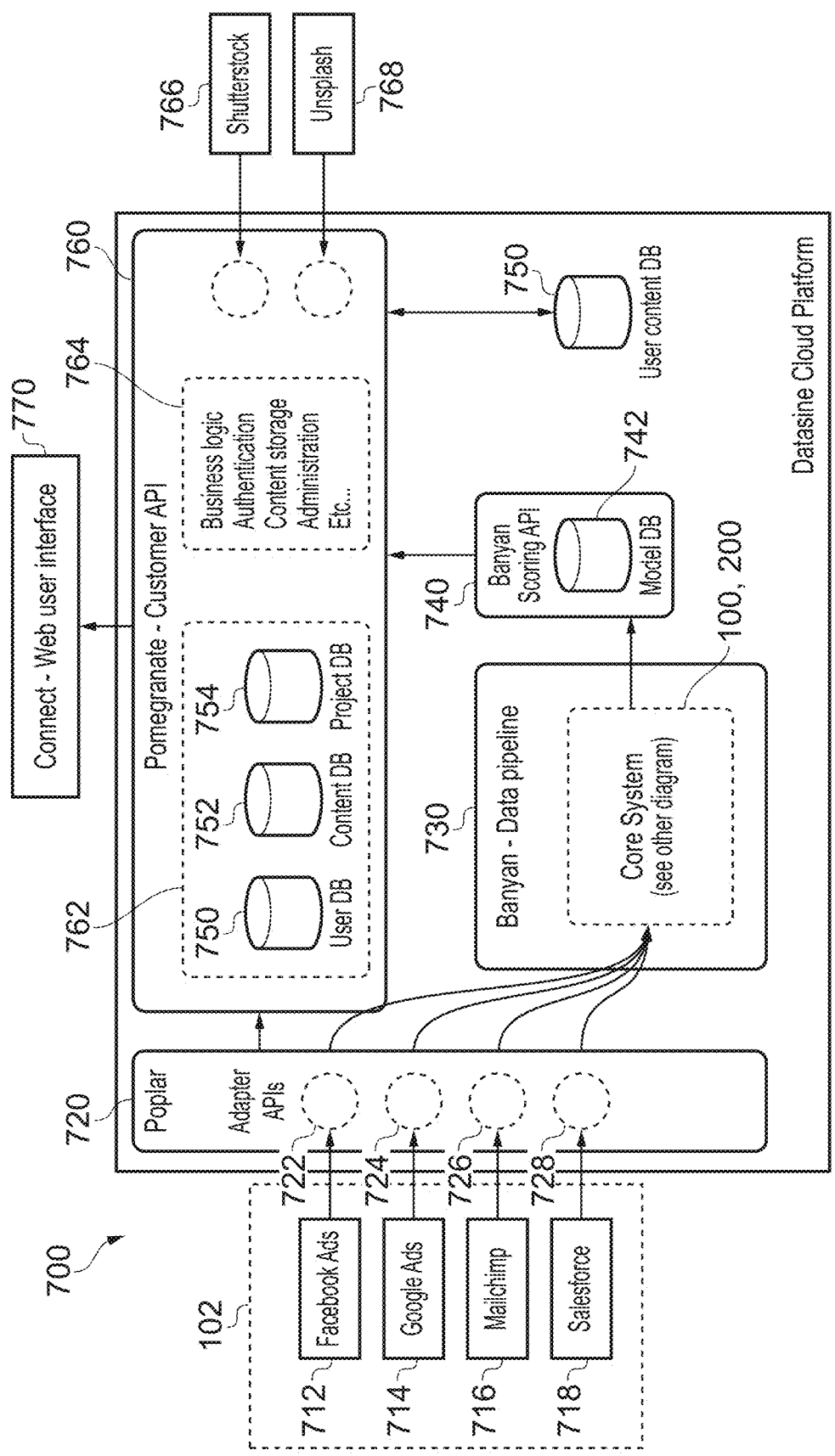
FIG. 7 is a diagram illustrating how, in some embodiments of the present invention, the core system may be implemented within a cloud platform.

To achieve this, a machine learning model is trained to predict the performance of new pieces of content controlling for the specific contexts each content is served in by simulating similar contexts from the metadata of the ad. This model is combined in a Bayesian setting (i.e. the Bayesian model 114) with the additional metadata features to also correct for the different base rates of settings and placements. Placements refer to where the content appears. Different placements will have inherently different interaction rates, for example, content which appears in a social media feed will have different engagement rates to content which appears in search results. Predictions from the system may be returned via a cloud hosted infrastructure, as illustrated in FIG. 7.

Monitoring Workflows—Live Campaign Optimisation

Figure 5:
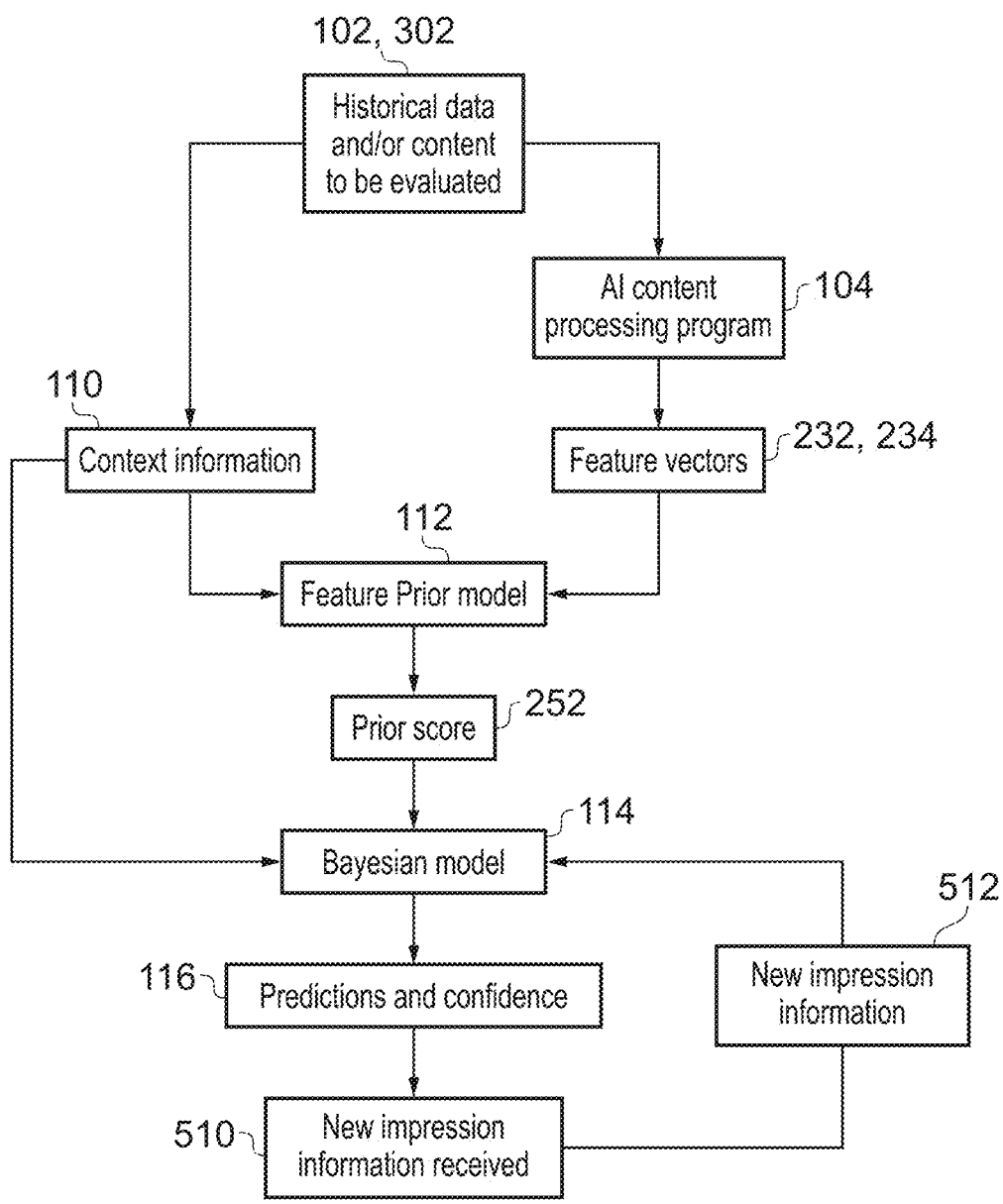
FIG. 5 is a flow chart illustrating how, in some embodiments of the present invention, the online Bayesian model may be capable of dynamic rescoring (i.e. adjusting predictions and/or confidence levels as a result of latest impression information)

The Online Bayesian model 114 enables rescoring of a live ad in real time according to the advertising performance of the ad in flight. This embodiment of the present invention is illustrated in FIG. 5. The model 114 continually adjusts the real time predictions of the ad's performance depending on new impression data 512. The receiving 510 of new impression information 512 triggers the Online Bayesian model 114 to re-run and update its predictions and confidence outputs 116. This may occur every time new impression information is received. Alternatively, this may occur after X instances of new impression information being received, e.g. every 5 times, every 10 times, every 50 times, every 100 times, every 1000 times, every 10,000 times, etc. Alternatively, this may occur after a predetermined time interval, e.g. once every second, once every minute, once every hour, once every day, once every week, etc. Alternatively, this may occur each time the user logs into the system, or refreshes an appropriate page, e.g. the page where the live ad is displayed.

Figure 6:
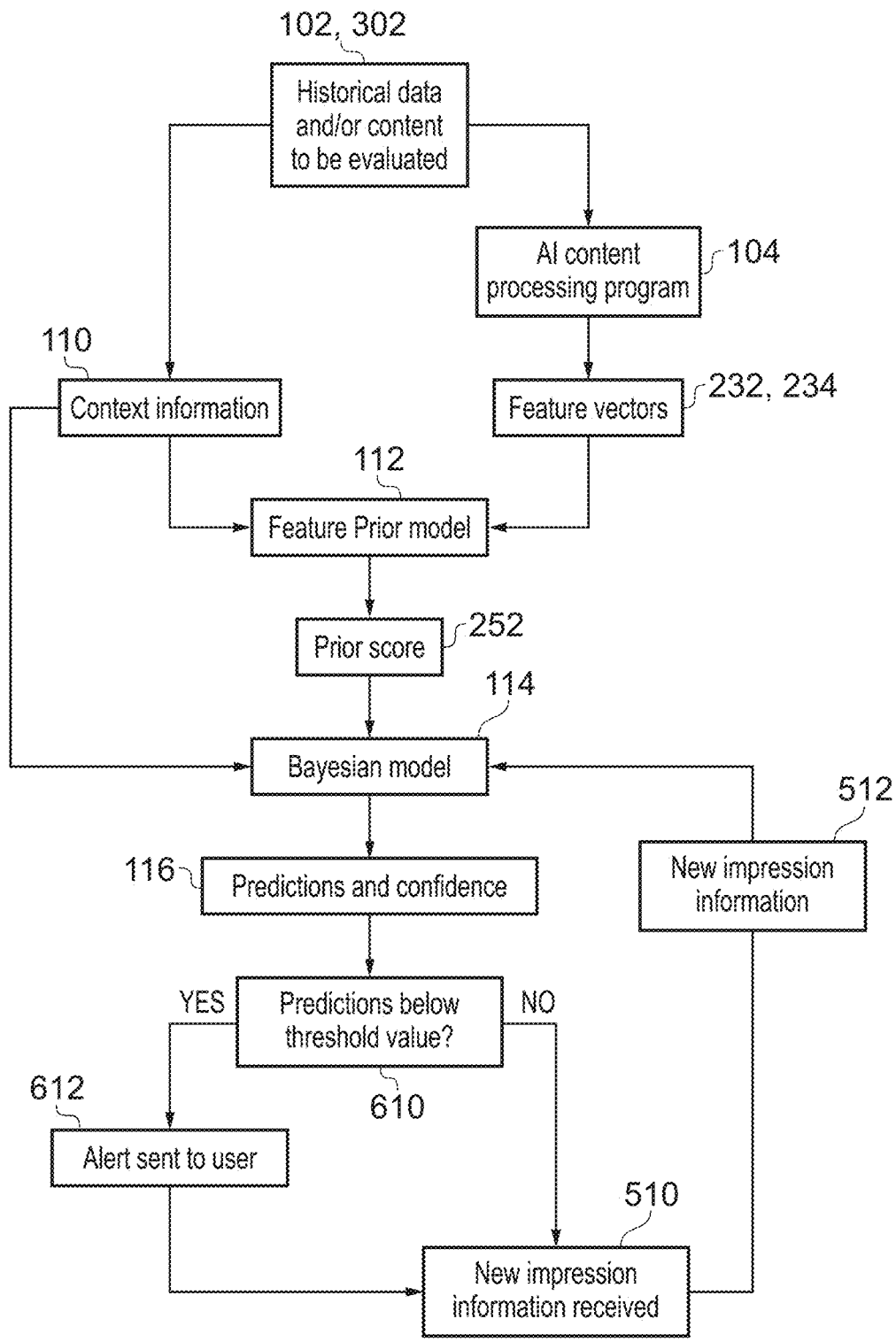
FIG. 6 is a flow chart illustrating how, in some embodiments of the present invention, an alert may be sent to a user if predictions drop below a threshold value as a result of latest impression information.

As illustrated in FIG. 6, if the prediction drops significantly below a predetermined threshold value 610, a prompt or alert may be shown to a user 612. Uncertainties may be returned alongside the real time predictions, this allows prompts to only be shown to a user when the model 114 is a predetermined level of confidence that there is an issue. If the prediction is not below the threshold value, no alert may be sent to a user. This dynamic rescoring allows a user to adapt their content based on updated predictions. For example, if, based on live impression data relating to the live ad, the core system 100, 200 predicts that the current content being used in the live ad is not going to perform well, the user may change and/or adapt the ad to use different content which is predicted to perform better.

The above rescoring approach can be applied to individual components of ads, the analysis of individual components of ads is described above in relation to the feature type model 260. The model continually rescores individual components of ads using real time advertising performance data, as well as the initial model based on predictions of performance. If the score for a particular component of the ad creative (e.g. image and/or text) falls significantly below a predetermined threshold value, a prompt may be shown to a user. As above, uncertainties may be returned alongside the predictions. For individual component rescoring, the Online Bayesian model learns additional modifiers for each component, which accounts for unique variation. These modifiers may be comprised from a value and an associated uncertainty. The modifiers are related to the indicators referred to above, which each pertain to an individual piece of content and allow the model to vary its estimation of each piece of content from the original score over time.

The Cloud Platform

In some embodiments of the present invention, the system is hosted on a cloud platform. The cloud platform may be hosted by a provider such as Amazon Web Services. One example of such a cloud platform 700 is illustrated in FIG. 7. The cloud platform 700 takes inputs of historical data 102, which may be sourced from content provider platforms such as Facebook 712, Google 714, Mailchimp 716 and/or Salesforce 718. Additionally or alternatively, historical data 102 may be uploaded by individual users, such that the historical data 102 comprises previous ad content used in the user's previous marketing campaigns. The user may also upload content to be evaluated 302. These are input into adapter APIs (application programming interfaces) 722, 724, 726, 728, which are hosted in an adapter API module 720. The adapter APIs 722, 724, 726, 728 feed data into the core system 100, 200. The core system operates as described above. The core system 100, 200 is hosted in a data pipeline module 730. The outputs of the core system 100, 200 (i.e. the predictions 116 with confidence levels, also known as scores 268, 282) are passed to a model database 742, which is hosted in a scoring API module 740. The model database 742 receives trained models relating to a user's account to be retrieved later when a user requests a prediction relating to some content. The model database 742 and the adapter API module 720 feed data into a customer API module 760. The customer API module 760 comprises one or more databases 762. In this example, the databases include a user database 750, a content database 752 and a project database 754. The customer API module 760 may further comprise information 764 such as business logic, authentication information, content storage information, administration information. The customer API module 760 may also store image data from platforms such as Shutterstock 766 and/or Unsplash 768, which provide stock imagery. The customer API module 760 is able to call Shutterstock and Unsplash via their own APIs to serve their content with the core system's output of scores 268, 282 overlaid. The user content database 750 is connected to the customer API module 760 such that the user content database 750 may upload and/or download data to/from the customer API module 760. The customer API module 760 is connected to a web user interface 770, allowing a user to upload data, view results of the system's analysis, and control the system. The user may upload arbitrary content to be scored. Alternatively or additionally, to score content, the user may either view an already created ad via their social media account through the described system, or, input the details of a new ad directly into the system.

Figure 9:
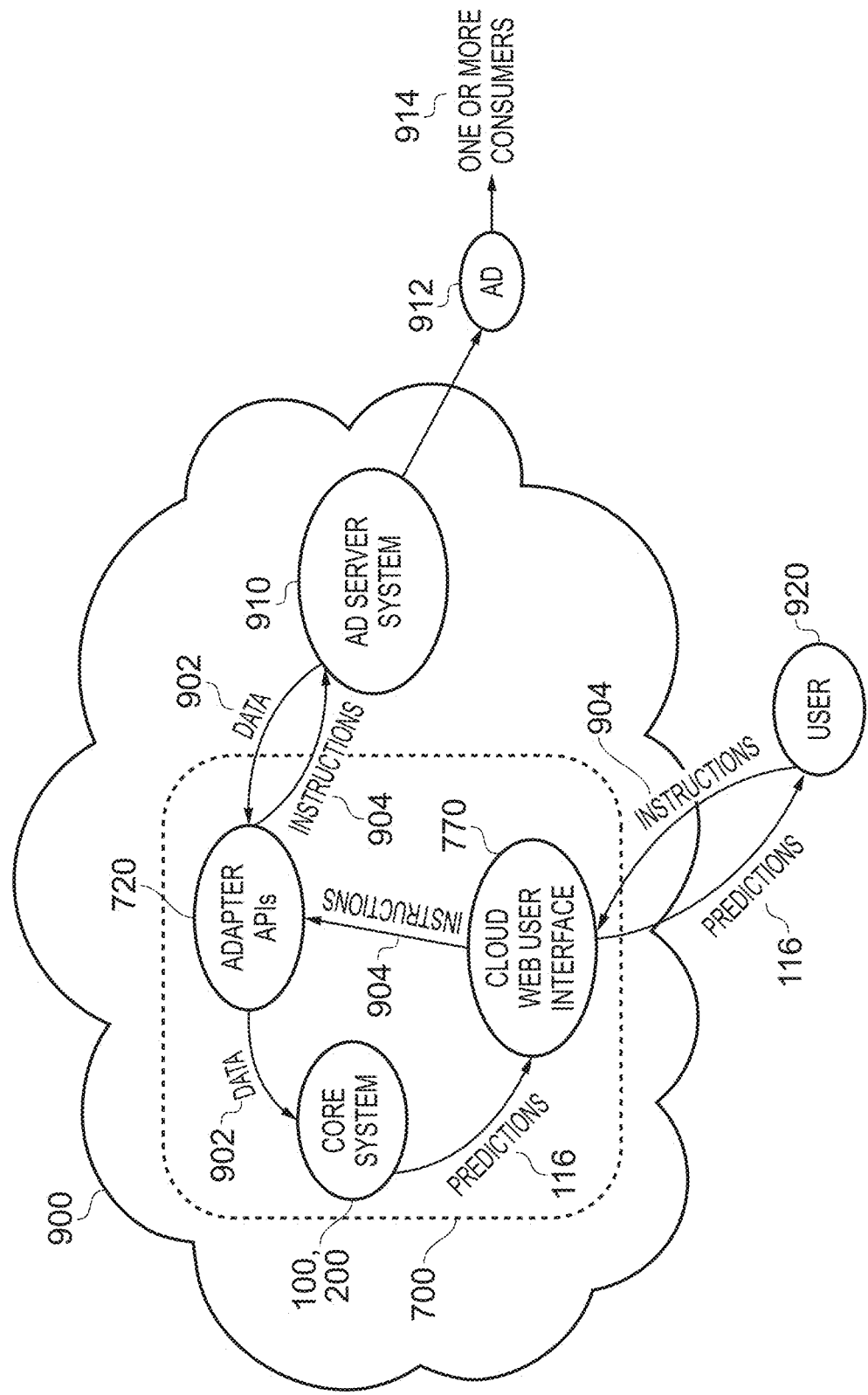
FIG. 9 is a diagram illustrating the relationship between the cloud, the core system and an ad server system, in accordance with some embodiments of the present invention.

FIG. 9 illustrates how a user may interact with the core system 100, 200 in embodiments where the system is hosted on the cloud platform 700. The cloud web user interface 770 allows a user 920 to interact with the core system 100, 200 hosted on the cloud platform 700. The user 920 may interact with the cloud web user interface 770 via one or more instructions 904. The cloud platform 700 and the ad server system 910 may be hosted in a cloud 900. A user 920 of the present invention may be a company deciding on an advertising campaign. The user 920 may choose and distribute ads via an ad server system 910. In response to user instructions 904, data 902 may be pulled from the ad server system 910 and uploaded to the cloud platform 700 via the adapter APIs 720. The uploaded data 902 may comprise one or more of historic data 102, content to be evaluated 302, and/or impression data 512. The adapter APIs 720 input the relevant data 902 to the core system 100, 200. The core system 100, 200 uses the uploaded data 902 to produce one or more predictions 116. The predictions 116 are sent to the web user interface 770 to be viewed by the user 920. The user 920 may then instruct changes via instructions 904 to be sent to the ad server system 910, based on the predictions 116. The user instructions 904 may be relayed to the ad server system 910 via adapter APIs 720. For example, the user 920 may instruct the adapter APIs 720 to pull multiple potential ads to the cloud platform 700 from the ad server system 910 as content to be evaluated 302. The core system 100, 200 may then output a prediction 116 for each piece of content (i.e. each potential ad). The prediction 116 may be sent via the cloud web user interface 770 to the user 920. The user 920 may then instruct 904 the ad server 910, via the adapter APIs 720 in the cloud 700, to produce an ad 912 using the piece of content with the highest prediction score out of the evaluated potential ads. The ad server system 910 may then distribute the ad 912 to one or more consumers 914. In most cases the ad 912 would be distributed to a plurality of consumers. When the ad 912 is live, the cloud 700 may pull impression data 512 from the ad server system 910 to update the consumer interaction predictions 116 of the ad 912. The impression data 512 allows the user 920 to obtain real-time predictions of how the ad 912 is likely to perform in the future, taking into account consumer interactions that have already occurred while the ad 912 has been live.

In some embodiments, the ad server system 910 may be instructed by a user 920 to adapt the content used in the ad 912 based on updated predictions 116 from the core system 100, 200. For example, as illustrated in FIG. 6, if the content being used in a live ad had associated impression data which showed the ad was performing below a threshold, an alert may be sent to the user 920. Upon receiving this alert, the user 920 may instruct 904 the ad server system 910, via the cloud platform 700, to swap out the content being used in the live ad with a different piece of content which is predicted to perform better than the content being used in the live ad. The improved ad may then be distributed to one or more consumers 914 by the ad server system 910.

The Computer System

Alternatively to the cloud-based system described above in relation to FIG. 7, the present invention may be implemented by a local computer system. An example of a computer system which may be used to perform embodiments of the present invention is shown in FIG. 8.

Figure 8:
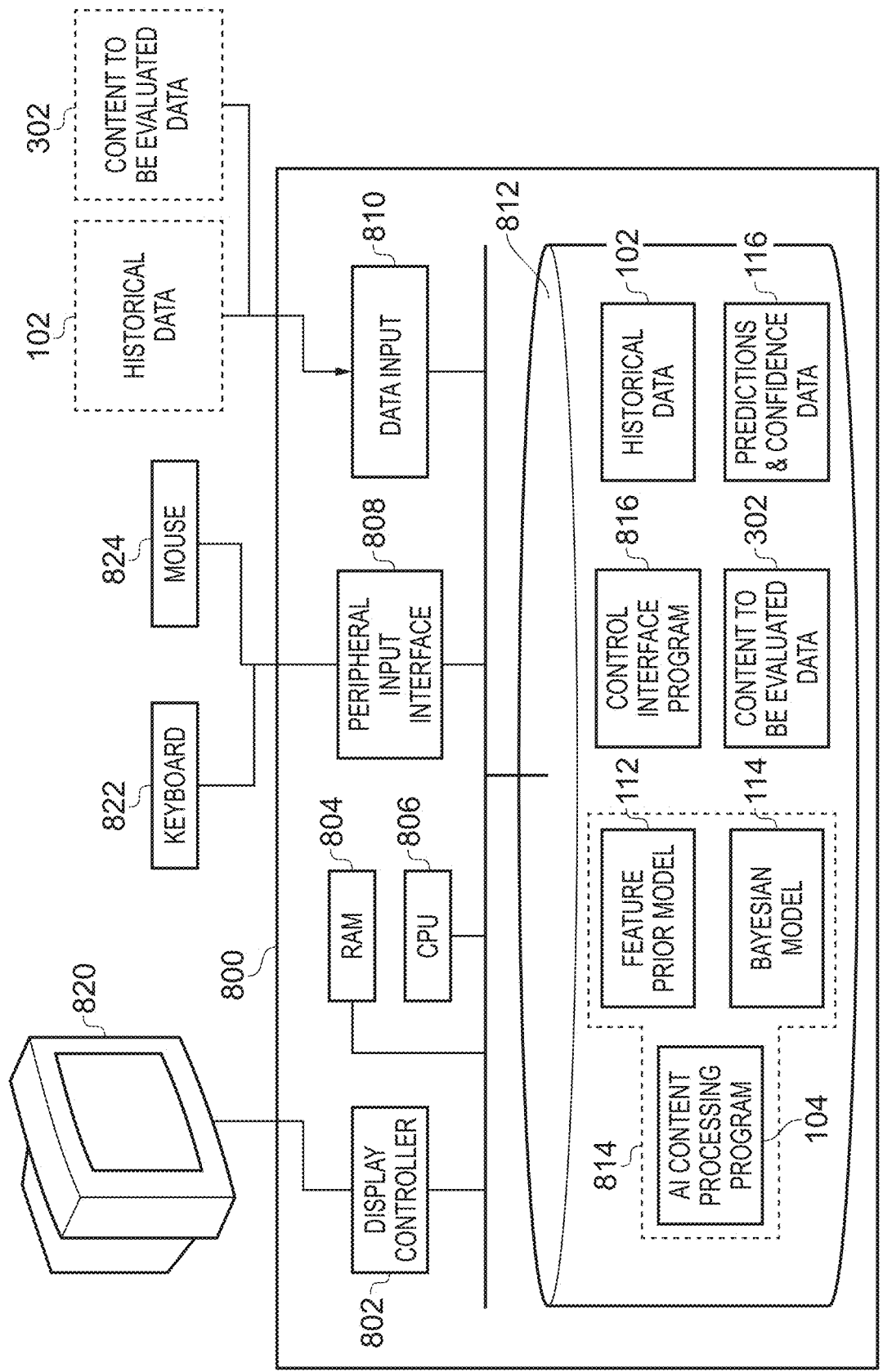
FIG. 8 is a block diagram of a system illustrating how, in some embodiments of the present invention, the core system may be implemented on a local computer system.

FIG. 8 is a block diagram illustrating an arrangement of a system according to an embodiment of the present invention. Some embodiments of the present invention may be designed to run on general purpose desktop or laptop computers. Therefore, according to an embodiment, a computing apparatus 800 is provided having a central processing unit (CPU) 806, and random access memory (RAM) 804 into which data, program instructions, and the like can be stored and accessed by the CPU. Additionally or alternatively, components may be stored in different cloud-based servers. For example, the databases may be hosted in separate locations to the model programs. The apparatus 800 is provided with a display screen 820, and input peripherals in the form of a keyboard 822, and mouse 824. Keyboard 822, and mouse 824 communicate with the apparatus 800 via a peripheral input interface 808. Similarly, a display controller 802 is provided to control display 820, so as to cause it to display images under the control of CPU 806. Historical data 102 and/or content to be evaluated data 302, can be input into the apparatus and stored via data input 810. The historical data 102 and the content to be evaluated data 302 may be stored remotely on a cloud platform, and obtained remotely when required. In this respect, apparatus 800 comprises a computer readable storage medium 812, such as a hard disk drive, writable CD or DVD drive, zip drive, solid state drive, USB drive or the like, upon which historical ad data 102, data relating to the content to be evaluated 302 and predictions and confidence data 116 can be stored. Alternatively, the data 102, 302, 116 and optionally the programs 814 could be stored on a web-based platform, as described in connection with FIG. 7 above, and accessed via an appropriate network. Computer readable storage medium 812 may also stores various programs, which when executed by the CPU 806 cause the apparatus 800 to operate in accordance with some embodiments of the present invention.

In particular, a control interface program 816 is provided, which when executed by the CPU 806 provides overall control of the computing apparatus, and in particular provides a graphical interface on the display 820, and accepts user inputs using the keyboard 822 and mouse 824 by the peripheral interface 808. The control interface program 816 also calls, when necessary, other programs to perform specific processing actions when required (not all programs are necessarily shown in FIG. 8). For example, an AI content processing program 104 may be provided which is able to operate on one or more of data 102, 302 indicated by the control interface program 816, so as to output feature vectors 232, 234 representing the content of the ads 216. The feature vectors 232, 234 and the context information data 110 are then used in the feature prior model 112 to produce a predicted score 252 for each ad, and/or each component of an ad. The predicted scores 252 are then fed into the Bayesian model 114, alongside further data. The Bayesian model 114 then outputs predictions and confidence data 116. The operations of the AI content processing program 104, feature prior model 112 and Bayesian model 114 are described in more detail above.

The detailed operation of the computing apparatus 800 will now be described. Firstly, the user launches the control interface program 816. The control interface program 816 is loaded into RAM 804 and is executed by the CPU 806. The user then launches a content evaluation program 814, which may be comprised of the AI content processing program 104, the feature prior model 112 and the Bayesian model 114. The programs act on the input data 102, 302 as described above. Additionally or alternatively, the user may interface through the system via a website. All of the required parts of the system may be exposed to the web via the API.

Various modifications whether by way of addition, deletion, or substitution of features may be made to above described embodiment to provide further embodiments, any and all of which are intended to be encompassed by the appended claims.

What is claimed is:

1. A computer-implemented method for automatically analyzing content to predict a consumer interaction rate of said content, based on historical consumer interaction rates of historical content, the method comprising:
    receiving content data from a computing platform, the content data relating to a first content displayed via a digital platform and comprising image data and/or text data, the content data having associated contextual metadata defining contextual attributes of said first content;
    processing the image data and/or the text data to determine feature vectors of the image data and/or the text data;
    inputting the associated contextual metadata and the feature vectors of the image data and/or the text data into a first machine learning (ML) model;
    predicting, using the first ML model, where said first content would be ranked within a plurality of historical content, the plurality of historical content having similar associated contextual metadata to the said first content, wherein the plurality of historical content is ranked by a historical consumer interaction rate, and wherein the historical consumer interaction rate is based on a plurality of types of actions taken by a consumer in response to the plurality of historical content;
    outputting a prior probability from the first ML model, the prior probability being based on a predicted rank of said first content;
    receiving, from the computing platform, additional metadata relating to said first content;
    inputting the additional metadata and the prior probability into a second ML model to output a first posterior probability representing a first predicted consumer interaction rate of said first content;
    retrieving, from the computing platform, impression data relating to a first performance of said first content;
    updating the second ML model based on the impression data;
    receiving, from the second ML model, a second posterior probability representing a second predicted consumer interaction rate of said first content based on the impression data; and
    updating, based on the second posterior probability, the digital platform by replacing the first content with a second content having a higher predicted consumer interaction rate.

2. The computer-implemented method of claim 1, wherein one or more pieces of content are analyzed such that each piece of content of the one or more pieces of content has an associated predicted consumer interaction rate, and the method further comprises selecting the first content from the one or more pieces of content, the first content having a highest predicted consumer interaction rate.

3. The computer-implemented method of claim 2, further comprising producing a first communication comprising the first content and distributing the first content to one or more consumers over a network.

4. The computer-implemented method of claim 3, wherein:
    the first communication has been distributed to one or more consumers such that the first communication comprises a live ad; and
    the impression data relates to a second performance of the live ad.

5. The computer-implemented method of claim 4, further comprising determining whether the second posterior probability is below a threshold value.

6. The computer-implemented method of claim 5, further comprising communicating an alert to a user if the second posterior probability is found to be below the threshold value.

7. The computer-implemented method of claim 5, wherein if the second posterior probability is found to be below the threshold value and two or more pieces of content of the one or more pieces of content were analyzed, the method further comprises:
    selecting the second content from a remaining one or more pieces of content of the one or more pieces of content, the second content having the higher predicted consumer interaction rate based on the second posterior probability associated with the first content and a plurality of associated predicted consumer interaction rates of the remaining one or more pieces of content; and
    producing a second communication comprising the second content and distributing the second content to the one or more consumers.

8. The computer-implemented method of claim 4, wherein the second posterior probability is produced either:
    a) every time new impression data is received;
    b) every Xth time new impression data is received, wherein X is an integer;
    c) once per predetermined time interval;
    d) when an instruction is received from a user; or
    e) when a webpage displaying the live ad is accessed.

9. The computer-implemented method of claim 1, wherein the processing of the image data and/or the text data to determine the feature vectors of the image data and/or the text data comprises using an artificial intelligence program.

10. The computer-implemented method of claim 9, wherein the artificial intelligence program comprises a computer vision module and/or a natural language processing module.

11. The computer-implemented method of claim 1, wherein the first content comprises an entire advertisement.

12. The computer-implemented method of claim 1, wherein the first content comprises a component of an advertisement.

13. The computer-implemented method of claim 1, wherein the consumer interaction rate refers to an action per impression rate.

14. A computer system for automatically analyzing content to predict a consumer interaction rate of said content, based on historical consumer interaction rates of historical content, the computer system comprising:
    a processor; and
    a memory including computer program code, the memory and the computer program code configured to, with the processor, cause the computer system to:
        receive content data from a computing platform, the content data relating to a first content displayed via a digital platform and comprising image data and/or text data, the content data having associated contextual metadata defining contextual attributes of said first content;

process the image data and/or the text data to determine feature vectors of the image data and/or the text data;

input the associated contextual metadata and the feature vectors of the image data and/or the text data into a first machine learning (ML) model;

predict, using the first ML model, where said first content would be ranked within a plurality of historical content, the plurality of historical content having similar associated contextual metadata to the said first content, wherein the plurality of historical content is ranked by a historical consumer interaction rate, and wherein the historical consumer interaction rate is based on a plurality of types of actions taken by a consumer in response to the plurality of historical content;

output a prior probability from the first ML model, the prior probability being based on a predicted rank of said first content;

receive, from the computing platform, additional metadata relating to said first content;

input the additional metadata and the prior probability into a second ML model to output a first posterior probability representing a first predicted consumer interaction rate of said first content;

retrieve, from the computing platform, impression data relating to a performance of said first content;

update the second ML model based on the impression data;

receive, from the second ML model, a second posterior probability representing a second predicted consumer interaction rate of said first content based on the impression data; and update, based on the second posterior probability, the digital platform by replacing the first content with a second content having a higher predicted consumer interaction rate.

* * * * *